United States Patent
De Valicourt et al.

(10) Patent No.: US 10,044,462 B2
(45) Date of Patent: Aug. 7, 2018

(54) OPTICAL RING NETWORK

(71) Applicant: Alcatel Lucent, Boulogne Billancourt (FR)

(72) Inventors: Guilhem De Valicourt, Holmdel, NJ (US); Yvan Pointurier, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 15/021,595

(22) PCT Filed: Aug. 29, 2014

(86) PCT No.: PCT/EP2014/068334
§ 371 (c)(1),
(2) Date: Mar. 11, 2016

(87) PCT Pub. No.: WO2015/043871
PCT Pub. Date: Apr. 2, 2015

(65) Prior Publication Data
US 2016/0233976 A1    Aug. 11, 2016

(30) Foreign Application Priority Data
Sep. 24, 2013 (EP) .................................. 13290228

(51) Int. Cl.
*H04J 14/02* (2006.01)
*H04B 10/20* (2006.01)
(Continued)

(52) U.S. Cl.
CPC ........ *H04J 14/0283* (2013.01); *H04B 10/275* (2013.01); *H04J 14/021* (2013.01);
(Continued)

(58) Field of Classification Search
CPC ............... H04J 14/0283; H04J 14/0204; H04J 14/0205; H04J 14/0206; H04J 14/021; H04B 10/275
(Continued)

(56) References Cited

U.S. PATENT DOCUMENTS

| 7,369,765 B2* | 5/2008 | Aoki .................... H04J 14/0204 398/45 |
| 7,650,076 B2* | 1/2010 | Su ........................ H04J 14/0204 398/82 |

(Continued)

FOREIGN PATENT DOCUMENTS

| CN | 1658543 | 8/2005 |
| CN | 1815932 | 8/2006 |

(Continued)

*Primary Examiner* — Ken N Vanderpuye
*Assistant Examiner* — Abbas H Alagheband
(74) *Attorney, Agent, or Firm* — Patti & Malvone Law Group, LLC

(57) ABSTRACT

An exemplary apparatus is provided for an optical node of an optical ring network. The optical node comprises a main branch with a wavelength blocker configured to block at least one wavelength of signals targeted to a particular node and to permit the signals received on the other wavelength channels pass, a reception unit tuned to the at least one wavelength dedicated to signals targeted to the particular node, a first optical coupler configured to transmit the signals received from a previous node of the optical ring network both to the main branch and to the reception unit, a transmission unit configured to transmit signals to a wavelength channel according to their targeted node, and a second optical coupler configured to receive the signals received from the main branch and from the transmission unit and to transmit the received signals toward a next node of the optical ring network.

16 Claims, 5 Drawing Sheets

(51) Int. Cl.
*H04J 14/00* (2006.01)
*H04Q 11/00* (2006.01)
*H04B 10/275* (2013.01)
*H04B 10/00* (2013.01)

(52) U.S. Cl.
CPC ...... *H04J 14/0204* (2013.01); *H04J 14/0205* (2013.01); *H04J 14/0206* (2013.01); *H04Q 11/00* (2013.01); *H04B 10/12* (2013.01); *H04B 10/152* (2013.01)

(58) Field of Classification Search
USPC .......................................... 398/79, 83, 59, 76
See application file for complete search history.

(56) References Cited

U.S. PATENT DOCUMENTS

| | | | | |
|---|---|---|---|---|
| 7,853,148 | B2* | 12/2010 | Akiyama | H04J 14/0204 398/83 |
| 8,526,819 | B2* | 9/2013 | Okabe | H04B 10/66 398/202 |
| 8,737,776 | B2* | 5/2014 | Boduch | H04J 14/0204 385/15 |
| 8,861,966 | B2* | 10/2014 | Zhu | H04J 14/0204 398/48 |
| 2003/0223682 | A1* | 12/2003 | Kinoshita | H04J 14/0204 385/24 |
| 2005/0084270 | A1* | 4/2005 | Caplan | H04L 1/0002 398/141 |
| 2005/0191054 | A1* | 9/2005 | Aoki | H04J 14/0204 398/45 |
| 2005/0276605 | A1* | 12/2005 | Pain | H04J 14/0204 398/79 |
| 2006/0023996 | A1* | 2/2006 | Nakagawa | H04J 14/0206 385/24 |
| 2006/0034610 | A1* | 2/2006 | Akiyama | H04J 14/0204 398/83 |
| 2006/0045532 | A1* | 3/2006 | Yano | H04B 10/25133 398/147 |
| 2006/0110162 | A1* | 5/2006 | Tian | H04J 14/0204 398/83 |
| 2006/0239684 | A1* | 10/2006 | Oguma | H04J 14/0204 398/83 |
| 2007/0047958 | A1* | 3/2007 | Gumaste | H04J 14/0204 398/69 |
| 2007/0086332 | A1* | 4/2007 | Way | H04J 3/14 370/223 |
| 2007/0286605 | A1* | 12/2007 | Feuer | H04J 14/0204 398/83 |
| 2008/0013950 | A1* | 1/2008 | Boudreault | H04J 14/0212 398/59 |
| 2008/0130101 | A1 | 6/2008 | Kakui | |
| 2008/0131128 | A1* | 6/2008 | Ota | H04J 14/0201 398/79 |
| 2008/0138066 | A1* | 6/2008 | Zhu | H04J 14/0204 398/39 |
| 2009/0022489 | A1* | 1/2009 | Way | H04J 14/0204 398/4 |
| 2012/0062985 | A1* | 3/2012 | Kakui | H01S 3/06758 359/337.2 |
| 2012/0121266 | A1* | 5/2012 | Okabe | H04B 10/66 398/76 |
| 2012/0195588 | A1* | 8/2012 | Way | H04J 14/0204 398/4 |
| 2013/0343755 | A1* | 12/2013 | Cvijetic | H04Q 11/0066 398/45 |

FOREIGN PATENT DOCUMENTS

| | | |
|---|---|---|
| EP | 1569494 | 8/2005 |
| JP | 2002186017 | 6/2002 |
| JP | 2005057722 | 3/2005 |
| JP | 2005244973 | 9/2005 |
| JP | 2006211591 | 8/2006 |
| JP | 2007124472 | 5/2007 |
| WO | 2006080279 | 8/2006 |

* cited by examiner

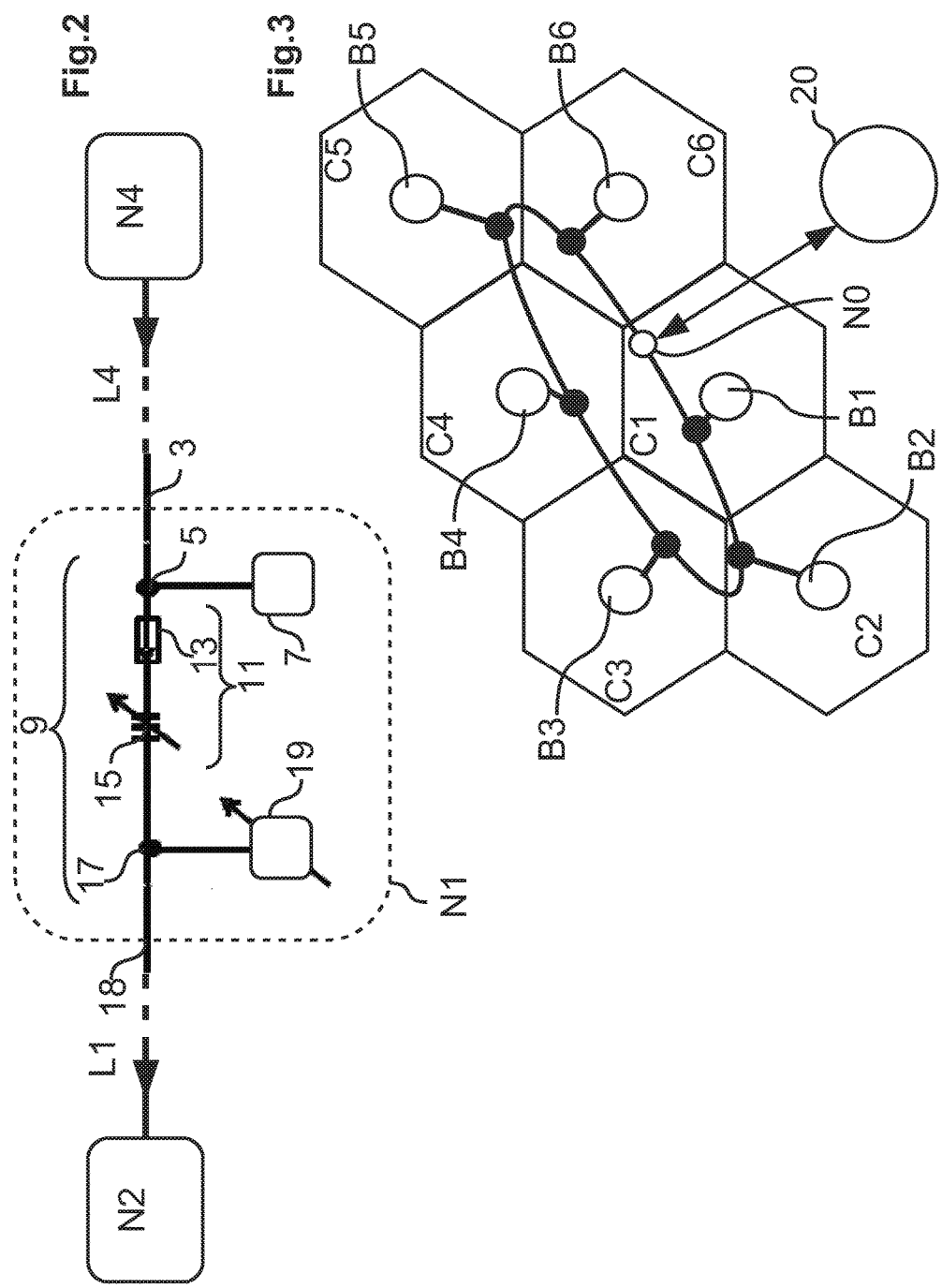

OPTICAL RING NETWORK

BACKGROUND OF THE INVENTION

The present invention relates to the field of telecommunication networks and more specifically to fast transmission enabling a fast transmission of data within a limited area and for a limited cost.

Optical fibers enable fast transmissions with large throughput thanks to the wavelength multiplexing. However, such networks require expensive equipment to ensure signal detection. Such equipments are fast tunable receivers based on coherent detection. Thus, for some applications such as the communication between neighboring base stations of a cellular network, such equipments are too expensive and provide a higher quality than required due to the limited distance between the different base stations.

SUMMARY OF THE INVENTION

It is therefore an object of the present invention to overcome the above mentioned drawbacks of the state of the art and to provide a solution that enables fast transmission within a limited area without requiring expensive equipment such as fast tunable receivers.

Thus, the present invention refers to an optical node destined to be implemented in an optical ring network comprising links configured for transmitting a plurality of multiplexed wavelength channels wherein at least one wavelength channel is dedicated to signals targeted to a particular node wherein the optical node comprises:
  a main branch with a wavelength blocker configured for blocking the at least one wavelength of the signals targeted to the node and for letting the signals received on the other wavelength channels pass,
  a reception unit tuned to the at least one wavelength dedicated to signals targeted to the node,
  a first optical coupler configured for transmitting the signals received from a previous node of the optical ring network both to the main branch of the node and to the reception unit,
  a transmission unit combined with the reception unit and configured for transmitting signals to a wavelength channel according to their targeted node,
  a second optical coupler configured for receiving the signals received both from the main branch and from the transmission unit and for transmitting the received signals toward a next node of the optical ring network.

According to another aspect of the present invention, the wavelength blocker comprises an isolator coupled with at least one Bragg grating.

According to a further aspect of the present invention, the receiving unit comprises at least one non-coherent receiver.

According to an additional aspect of the present invention, the transmission unit comprises at least one fast tunable laser.

According to another aspect of the present invention, the transmission unit and the reception unit are combined in a transceiver.

According to a further aspect of the present invention, the transmission unit and the reception unit are remote from the main branch and the optical node comprises a first optical circulator located next to the main branch and connected to the first and the second optical coupler and a second optical circulator connected to the transmission unit and the reception unit, the first and second optical circulators being linked by an optical link, the first circulator being configured for transmitting the signals received from the first coupler to the second optical circulator and for transmitting the signals received from the second optical circulator to the second optical coupler, the second optical circulator being configured for transmitting the signals received from the first optical circulator to the reception unit and for transmitting the signals received from the transmission unit to the first optical circulator.

According to an additional aspect of the present invention, the optical node comprises a base station remote from the main branch and the reception unit and the transmission unit are implemented within the base station.

The embodiments of the present invention also refer to an optical ring network comprising a plurality of nodes in accordance with one of the previous claims, the said nodes being linked by optical links, the said links being configured for transmitting a plurality of multiplexed wavelength channels wherein at least one wavelength channel is dedicated to signals targeted to a particular node.

According to another aspect of the present invention, the nodes comprise a base station of a cellular network, the base stations of the nodes being neighboring base stations and the optical ring network comprises an additional node linked to a backbone network.

According to a further aspect of the present invention, the additional node comprises:
  at least one reception unit tuned to the at least one wavelength of the signals targeted to the backbone network,
  at least one transmission unit for transmitting the signals received from the backbone network to the other nodes of the optical ring network,
  a demultiplexer configured for demultiplexing the signals received from a previous node of the optical ring network and for transmitting the at least one wavelength channel of the signals targeted to the backbone network to the at least one reception unit,
  a multiplexer configured for multiplexing the signals received from the at least one transmission unit and from the demultiplexer and for transmitting the multiplexed signals to a next node of the optical ring network.

According to an additional aspect of the present invention, the base stations are remote from the main branch of the nodes and comprise the transceivers.

BRIEF DESCRIPTION OF THE DRAWINGS

FIG. 2 is a diagram of a node structure according to an embodiment of the present invention;

FIG. 3 is a diagram of an optical ring network connecting six neighboring base stations;

In these drawings, the elements having the same reference correspond to elements having a similar function.

DETAILED DESCRIPTION OF THE INVENTION

Figure 1:
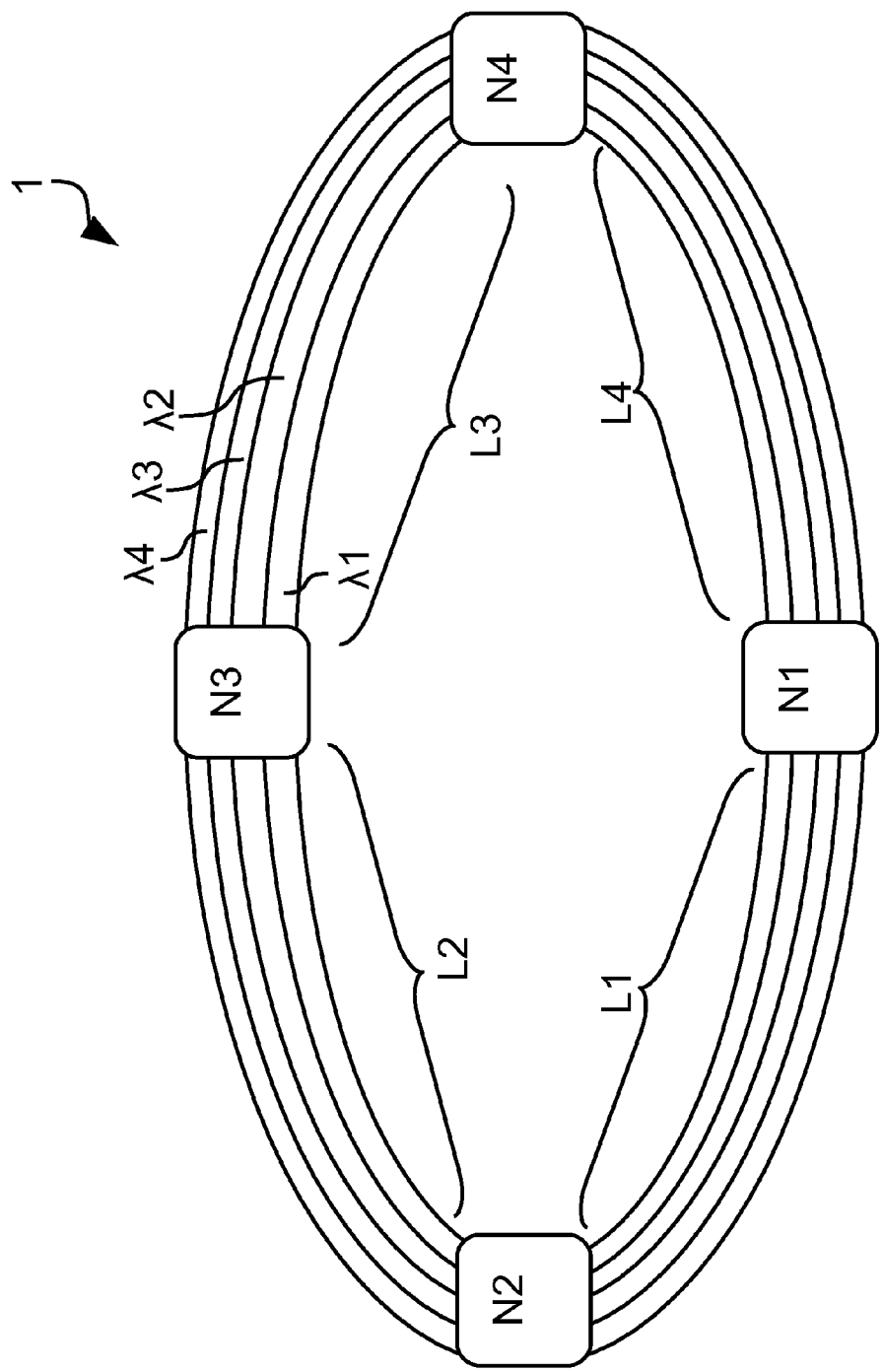
FIG. 1 is a general representation of an optical ring network.

The embodiments of the present invention refer to an optical ring network 1 comprising a plurality of nodes, four in the present example noted Ni with i=1 . . . 4, as represented in FIG. 1. The nodes Ni are linked by optical links noted Lj with j=1 . . . 4 such as optical fibers, for example single mode fibers. The optical ring network 1 is configured for transmitting a plurality of wavelength channels $\lambda$, the number of wavelength channels being equal or larger than the number of nodes Ni. In the present example, four wavelength channels noted $\lambda 1$, $\lambda 2$, $\lambda 3$ and $\lambda 4$ that are multiplexed according to a wavelength division multiplexing (WDM) technique to be transmitted through the optical ring network 1. It has to be noted that the different wavelengths are represented schematically by different lanes in the link, however all the wavelength channels are multiplexed in a single optical fiber corresponding to a link Lj. One wavelength channel $\lambda k$ with k=1 . . . 4 is dedicated to signals targeted to one node Ni, for example channel $\lambda 1$ is dedicated to signals targeted to node N1, $\lambda 2$ is dedicated to signals targeted to node N2, channel $\lambda 3$ is dedicated to signals targeted to node N3 and $\lambda 4$ is dedicated to signals targeted to node N4.

FIG. 2 represents the structure of a node Ni, N1 in the present example. The node N1 comprises an input 3 connected to the optical link L4 connected to the previous node, N4 in the present case. The input 3 is linked to an input of a first optical coupler 5. A first output of the optical coupler 5 is linked to a reception unit herein implemented by a receiver 7 which is tuned to the wavelength channel $\lambda 1$. The tuning is for example achieved by a filter located in front of the receiver 7 and configured for filtering all the wavelength except wavelength $\lambda 1$. Such filter can be integrated within the receiver 7, for example with a thin film technology. Thus, all the wavelength channels $\lambda k$ with k=1 . . . 4 are transmitted by the optical coupler 5, for example a 3 dB coupler, to the receiver 7 but only the signals transmitted on the channel $\lambda 1$ are detected by the receiver 7. The receiver 7 is for example an non-coherent receiver which can be reconfigured to detect another wavelength, for example during a reconfiguration of the optical ring network 1.

A second output of the first optical coupler 5 is connected to a main branch 9 comprising a wavelength blocker 11. The wavelength blocker 11 is implemented with an isolator 13 and a Bragg grating 15. The Bragg grating 15 is configured to send back the signals transmitted in the wavelength channel $\lambda 1$ dedicated to the node N1, the said signals being blocked by the isolator 13. Alternatively, the wavelength blocker 11 could be implemented with a ring resonator configured to route the wavelength channel $\lambda 1$ toward a receiver 7 of the node N1 and for transmitting the other wavelength channels toward the next node N2. The wavelength channel $\lambda 1$ dedicated to the node N1 is therefore freed at the output of the Bragg grating 15 so that new signals can be added on this wavelength channel $\lambda 1$ by the subsequent nodes. The output of the Bragg grating 15 is connected to an input of a second optical coupler 17, for example a 3 dB coupler. An other input of the second optical coupler 17 is connected to a transmission unit herein implemented as a transmitter 19, for example a fast tunable laser, configured to transmit signals on the wavelength channels $\lambda 2$, $\lambda 3$ and $\lambda 4$ dedicated to the other nodes N2, N3 and N4.

In order to transmit these signals, the transmitter 19 has to be aware of the free time intervals, for example time slots in the case of a slotted network, within these wavelength channels $\lambda 2$, $\lambda 3$ and $\lambda 4$ to avoid the superimposition of two signals within a single wavelength channel which would not be detectable by the targeted node. Such determination of the free time intervals can be achieved for example by photodiodes located at the input of the node and configured for detecting signals transmitted on the different wavelength channels $\lambda 2$, $\lambda 3$ and $\lambda 4$. Alternatively, the transmission of the different signals can be scheduled by a centralized control interface so that the authorization for transmitting on a wavelength channel is given directly by the control interface to the transmitter 19. If signals need to be transmitted from node N1 to node N4, the transmitter 19 is tuned on the wavelength $\lambda 4$ dedicated to signals targeted to node N4 and when a free time interval is detected on this wavelength channel $\lambda 4$, the transmitter emits a signal, for example a packet or a plurality of packets if depending on the duration of the free time interval, which are transmitted to the second optical coupler 17.

Thus, the signals coming from the transmitter 19 and from the main branch 9 are transmitted by the second optical coupler 17 to the output 18 of the node toward the next node N2 via the optical link L1.

Such configuration enables providing a low cost optical ring network as neither fast tunable receivers nor coherent detection equipment are necessary. Furthermore, such optical ring network can be easily modified to cope with an increase of traffic. Indeed, instead of allocating one wavelength channel to a given node, two wavelength channels can be dedicated to signals targeted to the said node. Such modification only requires an additional Bragg grating 15 configured for blocking the signals transmitted on the additional wavelength channel and one additional receiver 7 tuned to the additional wavelength. An additional transmitter 19 may also be added to transmit more packets toward the other nodes if the other nodes are also upgraded with an additional receiver 7.

Thus, such optical ring network configuration allows an easy adaptation to the variations of traffic. Furthermore, if the size of the optical ring network 1 remains limited, for example a few dozens of kilometers (up to 50 kilometers for example), no amplifier is required which contributes to a low cost optical ring network.

According to another embodiment of the node Ni which will be described in more details in the following of the description based on FIGS. 5 and 6, the transmitter 19 and the receiver 7 may be remote from the main branch 9 using optical couplers 29, 31 and an optical fiber 33.

According to an aspect of the present invention, the optical ring network 1 is used to connect the neighboring base stations of a cellular network. The neighboring base stations herein refers to base stations located in a common area so that a user terminal can be connected simultaneously to two of these neighboring base stations. The number of base stations connected to the optical ring network 1 is limited, for example to six base stations as represented in FIG. 3, in order to limit the size of the optical ring network and to ensure that the base stations are neighboring base stations. Indeed, in order to manage the handovers of the user terminals and to provide high bitrates, neighboring base stations have to communicate with each other in a fast and efficient way. Such efficient communication is provided by the optical ring network 1. Thus, each base station herein noted B1, B2 . . . B6 is associated with a node N1 . . . N6. Each base station covers an area corresponding to a cell C1 . . . C6. Furthermore, the base stations B1 . . . B6 have to communicate with the backbone network 20 so that the optical ring network 1 comprises an additional node herein noted N0 connected to the backbone network 20. The signals targeted to the backbone network 20, for example signals received from user equipments of the cellular network, are therefore transmitted on the wavelength channels dedicated to the node N0. Furthermore, as represented in FIG. 3, it can be necessary or more convenient that the base station B1 . . . B6 be remote from the nodes of the optical ring network. An embodiment enabling remote base stations will be described in detail in the following of the description.

Figure 4:
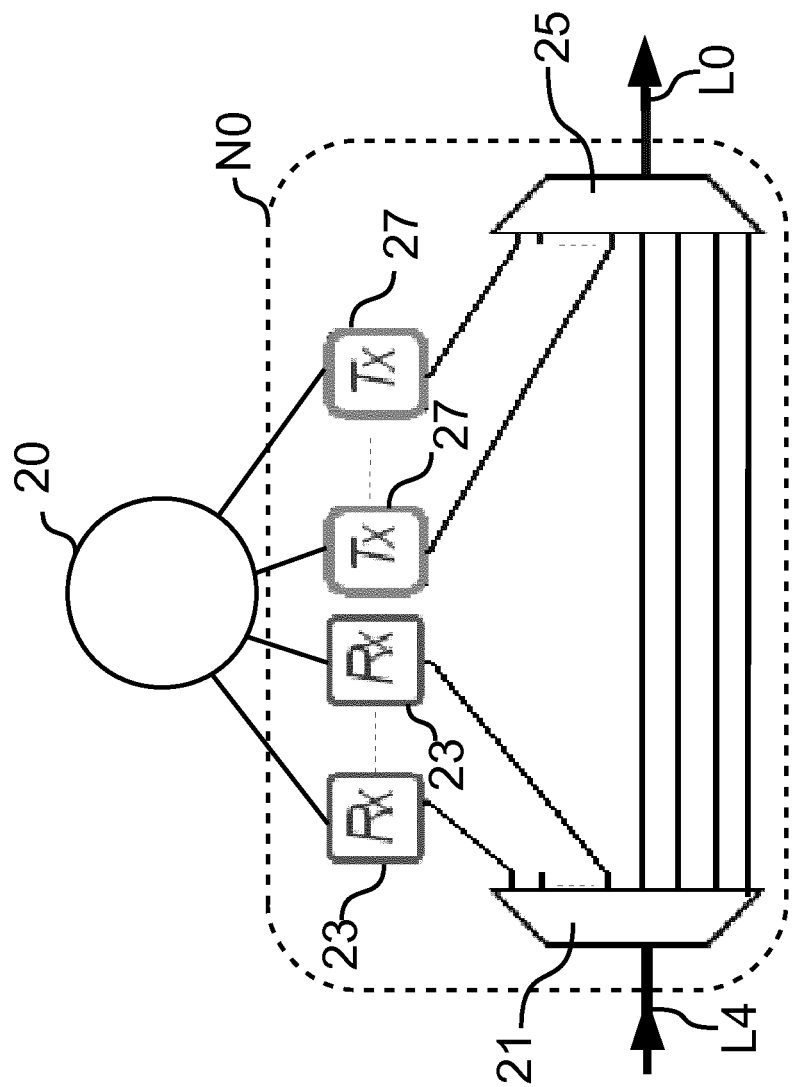
FIG. 4 is a diagram of an additional node ensuring traffic with the backbone network.

FIG. 4 represents an example of the structure of the node N0. The node N0 comprises a demultiplexer 21 having its input linked to the previous node, for example N4, via an optical link L4. The demultiplexer 21 also comprises a plurality of outputs corresponding to the demultiplexed wavelength channels. The demultiplexer 21 is for example implemented as arrayed waveguide gratings. The node N0 also comprises a plurality of receivers 23 linked to the backbone network 20 and tuned to the wavelength corresponding to the signals targeted to the backbone network 20. For example, one wavelength per node of the optical ring network 1 may be dedicated to the traffic with the backbone network 20. The outputs of the demultiplexer 21 corresponding to signals targeted to other nodes of the optical ring network are linked to the inputs of a multiplexer 25, for example implemented as arrayed waveguide gratings. The arrayed waveguide gratings also act as filters and can be used to select the wavelength channel which is transmitted toward a given receiver 23. Node N0 also comprises a plurality of transmitters 27 linked to the backbone network 20 which are tuned to a particular wavelength associated with the signals targeted to one node of the optical ring network 1. The output of the multiplexer 25 is linked to the next node, N1 in the present case, via the link L0. Thus, the number of transmitters 27 corresponds at least to the number of nodes in the optical ring network and is higher if more than one wavelength channel is dedicated to a particular node. This particular structure for the node N0 is required due to the high number of wavelengths that are dropped toward the backbone network 20. Indeed, with a structure similar to the nodes previously described many wavelength gratings 15 would be necessary to block signals transmitted on all the wavelength channels destined to the backbone network 20 and these wavelength grating 15 would introduce losses proportional to the number of nodes in the optical ring network 1. These losses in addition with the losses due to the optical coupler 5 and 17 will limit the number of nodes in order to get the required quality of signal at destination.

Figure 5:
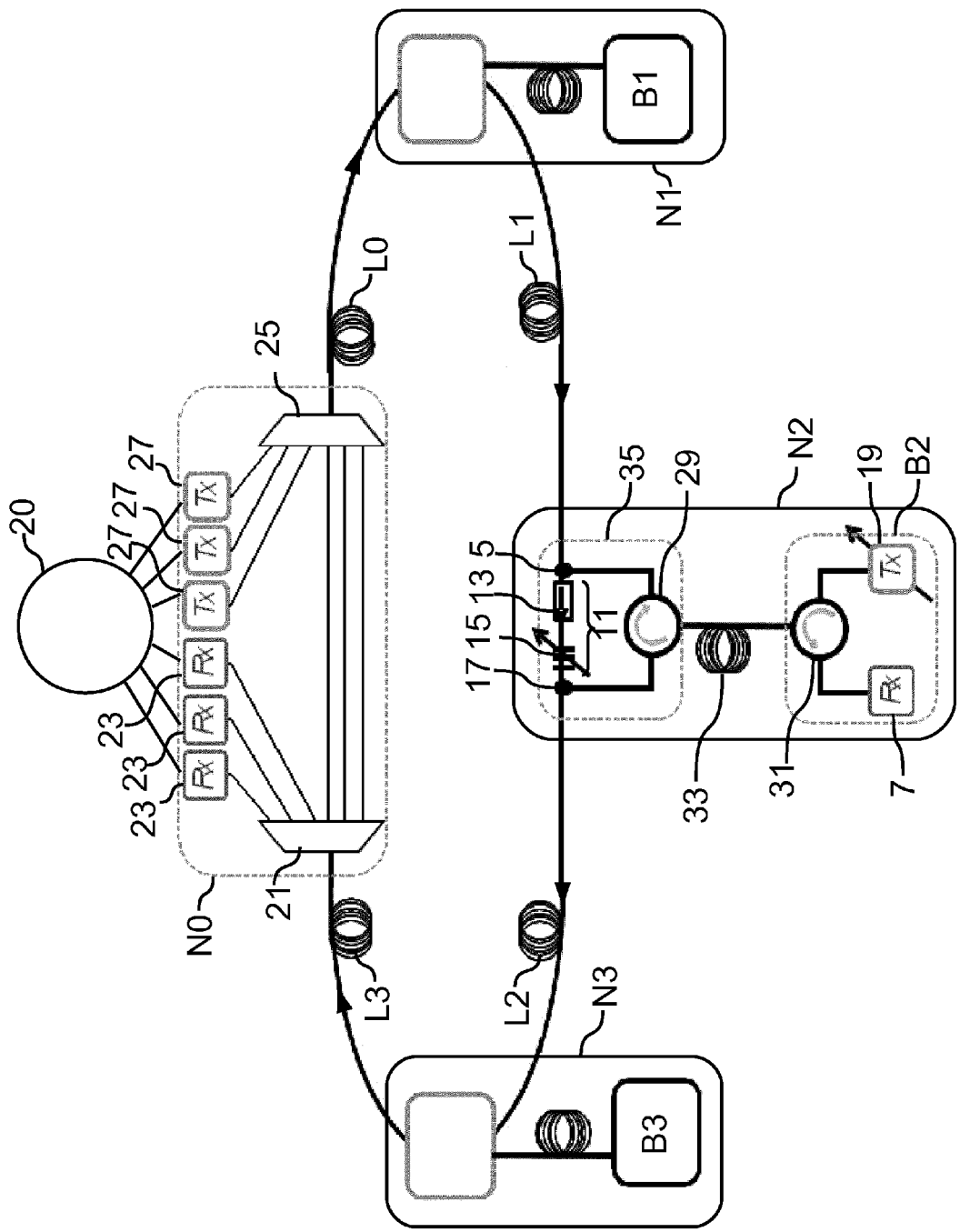
FIG. 5 is a diagram of an optical ring network according to an embodiment of the present invention.

FIG. 5 represents an example of optical ring network 1 comprising a node N0 connected to the backbone network 20 and three nodes N1, N2 and N3 comprising a remote base station noted respectively B1, B2 and B3. The node N0 has the same structure as presented in FIG. 4 and comprises three transmitters 27 and three receivers 23 dedicated respectively to the three nodes N1, N2 and N3. The structure of the other nodes N1, N2 and N3 is detailed for node N2. It comprises a first optical coupler 5 having its input connected to the previous node N1 via the link L1, a first output connected to the main branch 11 comprising an isolator 13, a Bragg grating 15 and a second optical coupler 17 and a second output connected to a first optical circulator 29. This first circulator 29 is also connected to a second circulator 31 which is a remote circulator located in the base station B2 and to an input of the second optical coupler 17. The first 29 and the second 31 circulators are linked by an optical link 33, for example a single mode fiber. The first circulator 29 is configured for transmitting the signals received from the first coupler 5 to the second optical circulator 31 and for transmitting the signals received from the second optical circulator 31 to the second optical coupler 17. The second circulator 31 is connected to a receiver 7 and a transmitter 19 which form a transceiver located in the remote base station B2. the second circulator 31 is configured for transmitting the signals received from the first optical circulator 29 to the receiver and for transmitting the signals received from the transmitter 19 to the first optical circulator 29. Thus, the node N2 comprises a first part 35 with the main branch 11 and the first circulator 29 and a second part remote from the first part corresponding to the base station B2 and comprising the transmitter 19, the receiver 7 and the second optical circulator 31. The optical ring network 1 of FIG. 5 comprises 6 wavelength channels noted λ1, λ2 . . . λ6, λ1 is dedicated to signals targeted to node N1, λ2 is dedicated to signals targeted to node N2, λ3 is dedicated to signals targeted to node N3 and λ4 is dedicated to signals transmitted from node N1 to the backbone network 20, λ5 is dedicated to signals transmitted from node N2 and the backbone network 20 and λ6 is dedicated to signals transmitted from node N3 to the backbone network 20.

It has to be noted that the optical ring network 1 of FIG. 5 is represented with three nodes N1, N2 and N3 only as an example and the number of nodes is only limited by the signal quality desired for the signals transmitted through the optical ring network 1.

Furthermore, as indicated previously, the capacity of a node can be increased to cope with an increase of traffic. In such case, the structure of node N2 represented in FIG. 5 can be modified as represented in node NT in FIG. 6. The structure remains the same as node N2 but a second Bragg grating 15 is added between the first Bragg grating 15 and the second coupler 17. This second Bragg grating is configured for blocking the added wavelength channel, for example λ7. A second receiver 7 is also connected to the second circulator 31 and tuned to the added wavelength λ7. An additional transmitter 19 may also be connected to the second circulator 31 to increase the transmission capacity towards the other nodes. Accordingly, with a wavelength blocker 11 implemented with a ring resonator, the capacity can be increased by adding a second ring resonator configured for routing a second wavelength channel toward a second receiver 7.

Figure 6:
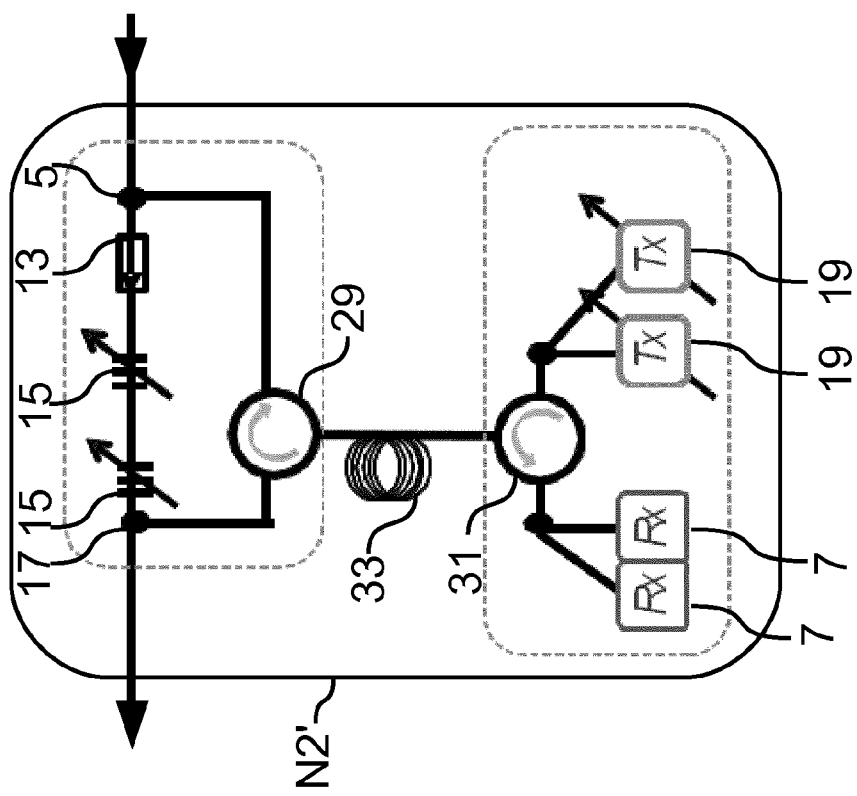
FIG. 6 is a diagram of an upgraded node.

The node structure disclosed in FIG. 6 may also be used to connect two neighboring base stations on a common optical node, a first receiver 7 and a first transmitter 19 belonging to a first base station and a second receiver 7 and a second transmitter 19 belonging to a second base station.

Thus, the nodes and the optical ring network of the present invention enable to obtain a low cost ring network providing modularity to adapt to an increase of traffic and are particularly well adapted to connect neighboring base stations of a cellular network and to ensure communication with the backbone network.

The invention claimed is:

1. An optical node of an optical ring network comprising links configured to transmit a plurality of multiplexed wavelength channels, the optical node comprising:
   a wavelength blocker configured to block at least one wavelength channel of the plurality of multiplexed wavelength channels that has signals targeted to the optical node and to permit other wavelength channels to pass, wherein the wavelength blocker comprises at least one Bragg grating linked directly to an isolator, the direct link being only at an output of the isolator;
   a reception unit tuned to the at least one wavelength channel;
   a first optical coupler configured to transmit the plurality of multiplexed wavelength channels received from a previous node of the optical ring network to the reception unit and to the wavelength blocker, wherein the first optical coupler is linked directly to an input of the isolator;

a transmission unit configured to transmit signals to at least one of the other wavelength channels; and a second optical coupler configured to receive signals from an output of the at least one Bragg grating and from the transmission unit, and to transmit the received signals toward a next node of the optical ring network.

2. The optical node in accordance with claim 1, wherein the reception unit comprises at least one non-coherent receiver.

3. The optical node in accordance with claim 1, wherein the transmission unit comprises at least one fast tunable laser.

4. The optical node in accordance with claim 1, wherein the transmission unit and the reception unit are combined in a transceiver.

5. The optical node in accordance with claim 1, wherein the transmission unit and the reception unit are remote from optical components of the optical node, and wherein the optical node comprises a first optical circulator located next to the optical components and connected to the first optical coupler and the second optical coupler and a second optical circulator connected to the transmission unit and the reception unit, the first optical circulator and the second optical circulator being linked by an optical link, the first optical circulator being configured to transmit the signals received from the first optical coupler to the second optical circulator and to transmit the signals received from the second optical circulator to the second optical coupler, the second optical circulator being configured to transmit the signals received from the first optical circulator to the reception unit and to transmit the signals received from the transmission unit to the first optical circulator.

6. The optical node in accordance with claim 5, further comprising a base station remote from the optical components, wherein the base station comprises the reception unit and the transmission unit.

7. The optical ring network comprising a plurality of nodes in accordance with claim 1, the plurality of nodes being linked by optical links, the optical links being configured to transmit a plurality of multiplexed wavelength channels.

8. The optical ring network in accordance with claim 7, wherein the plurality of nodes comprises base stations of a cellular network, the base stations being neighboring base stations, and wherein the optical ring network comprises an additional node linked to a backbone network.

9. The optical ring network in accordance with claim 8, wherein the additional node comprises:
at least one reception unit tuned to the at least one wavelength of the signals targeted to the backbone network;
at least one transmission unit to transmit the signals received from the backbone network to the other nodes of the optical ring network;

a demultiplexer configured to demultiplex the signals received from a previous node of the optical ring network and to transmit the at least one wavelength channel of the signals targeted to the backbone network to the at least one reception unit; and a multiplexer configured to multiplex the signals received from the at least one transmission unit and from the demultiplexer and to transmit the multiplexed signals to a next node of the optical ring network.

10. The optical ring network in accordance with claim 8, wherein the base stations are remote from optical components of the optical node.

11. The optical node in accordance with claim 1, wherein the reception unit is tuned by a filter located in front of the reception unit, the filter being configured for filtering all the wavelength channels except the at least one wavelength channel.

12. A method for an optical node of an optical ring network comprising links configured to transmit a plurality of multiplexed wavelength channels, comprising:
receiving the plurality of multiplexed wavelength channels from a previous node of the optical ring network at a first optical coupler configured to transmit the plurality of multiplexed wavelength channels to a reception unit and a wavelength blocker, wherein the wavelength blocker comprises at least one Bragg grating linked directly to an isolator, the direct link being only at an output of the isolator, and wherein an output of the at least one Bragg grating is linked to a second optical coupler, and wherein the first optical coupler is linked directly to an input of the isolator, and wherein the reception unit is tuned to at least one wavelength channel of the plurality of multiplexed wavelength channels;
blocking the at least one wavelength channel of the plurality of multiplexed wavelength channels that has signals targeted to the optical node and permitting signals of other wavelength channels to pass; and
transmitting the signals of the other wavelength channels toward a next node of the optical ring network.

13. The optical node in accordance with claim 1, wherein the reception unit is tuned by a filter integrated within the reception unit with a thin film technology.

14. The optical node in accordance with claim 1, wherein a first output of the first optical coupler is linked to the reception unit and a second output of the first optical coupler is linked to the wavelength blocker.

15. The optical node in accordance with claim 1, wherein the received signals are transmitted directly from the second optical coupler toward the next node of the optical ring network.

16. The optical node in accordance with claim 1, wherein the optical ring network has a size of up to 50 kilometers.

* * * * *